(12) United States Patent
Boyden et al.

(10) Patent No.: US 9,800,738 B2
(45) Date of Patent: Oct. 24, 2017

(54) SYSTEMS AND METHODS FOR MONITORING SOUND DURING AN IN-BUILDING EMERGENCY

(71) Applicant: Elwha LLC, Bellevue, WA (US)

(72) Inventors: Edward S. Boyden, Chestnut Hill, MA (US); Jesse R. Cheatham, III, Seattle, WA (US); William D. Duncan, Mill Creek, WA (US); Bran Ferren, Beverly Hills, CA (US); Roderick A. Hyde, Redmond, WA (US); Muriel Y. Ishikawa, Livermore, CA (US); Jordin T. Kare, San Jose, CA (US); Stephen L. Malaska, Redmond, WA (US); Nathan P. Myhrvold, Medina, WA (US); David B. Tuckerman, Lafayette, CA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 35 days.

(21) Appl. No.: 14/699,929

(22) Filed: Apr. 29, 2015

(65) Prior Publication Data
US 2015/0244873 A1  Aug. 27, 2015

Related U.S. Application Data

(63) Continuation of application No. 14/021,147, filed on Sep. 9, 2013.

(51) Int. Cl.
*G08B 21/18* (2006.01)
*H04M 11/04* (2006.01)
*H04R 27/00* (2006.01)

(52) U.S. Cl.
CPC .......... *H04M 11/04* (2013.01); *G08B 21/182* (2013.01); *H04R 27/00* (2013.01); *H04R 2227/005* (2013.01); *H04R 2410/00* (2013.01)

(58) Field of Classification Search
CPC .............................. G01L 17/26; G08B 21/182
(Continued)

(56) References Cited

U.S. PATENT DOCUMENTS 4,023,146 A * 5/1977 Carroll ........................ 710/113
5,568,535 A * 10/1996 Sheffer et al. ................ 379/39
(Continued)

FOREIGN PATENT DOCUMENTS

JP   2007-142835   6/2007
JP   2009-230642   10/2009
(Continued)

OTHER PUBLICATIONS

PCT International Search Report; International App. No. PCT/US2014/054322; Dec. 11, 2014; pp. 1-4.
(Continued)

*Primary Examiner* — Brent Swarthout

(57) ABSTRACT

A system for monitoring a building having one or more microphones coupled to a telephone includes a detector configured to detect a triggering event within the building and transmit an activating signal when the triggering event is detected, and a control module configured to receive the activating signal from the detector. The control module is programmed to activate at least one of the one or more microphones to monitor sound when the activating signal is received.

6 Claims, 5 Drawing Sheets

(58) Field of Classification Search
USPC ............... 340/286.01, 286.05, 331, 332, 506
See application file for complete search history.

(56) References Cited

U.S. PATENT DOCUMENTS

| | | | |
|---|---|---|---|
| 5,736,927 | A | 4/1998 | Stebbins et al. |
| 6,430,528 | B1 | 8/2002 | Jourjine et al. |
| 6,646,545 | B2 * | 11/2003 | Bligh ..................... 340/286.05 |
| 7,378,980 | B2 | 5/2008 | McFarland |
| 7,495,544 | B2 | 2/2009 | Stilp |
| 7,511,614 | B2 | 3/2009 | Stilp et al. |
| 7,532,114 | B2 | 5/2009 | Stilp |
| 7,579,945 | B1 * | 8/2009 | Richter et al. ................ 340/506 |
| 7,986,231 | B1 | 7/2011 | Bentley et al. |
| 7,990,805 | B2 | 8/2011 | Kumhyr et al. |
| 8,369,184 | B2 | 2/2013 | Calhoun |
| 8,917,186 | B1 | 12/2014 | Grant |
| 2003/0021188 | A1 | 1/2003 | Baranek et al. |
| 2004/0252023 | A1 | 12/2004 | Xydis |
| 2005/0237186 | A1 | 10/2005 | Fisher et al. |
| 2005/0244014 | A1 | 11/2005 | Elko et al. |
| 2006/0071780 | A1 | 4/2006 | McFarland |
| 2006/0132303 | A1 | 6/2006 | Stilp |
| 2007/0230270 | A1 | 10/2007 | Calhoun |
| 2008/0001734 | A1 | 1/2008 | Stilp et al. |
| 2008/0084788 | A1 | 4/2008 | Showen et al. |
| 2008/0197999 | A1 | 8/2008 | Henderson |
| 2009/0033505 | A1 | 2/2009 | Jones et al. |
| 2011/0003577 | A1 | 1/2011 | Rogalski et al. |
| 2012/0063270 | A1 | 3/2012 | Angell et al. |
| 2012/0086570 | A1 * | 4/2012 | Gancarcik .......... G08B 13/1672 340/533 |
| 2012/0229275 | A1 | 9/2012 | Mattern |
| 2012/0275273 | A1 | 11/2012 | Showen |
| 2013/0139600 | A1 | 6/2013 | McEwen-King et al. |
| 2013/0150004 | A1 | 6/2013 | Rosen |
| 2014/0173961 | A1 | 6/2014 | Goren et al. |
| 2014/0218518 | A1 | 8/2014 | Oliver |
| 2014/0253326 | A1 * | 9/2014 | Cho et al. ................ 340/539.13 |
| 2014/0259114 | A1 | 9/2014 | Jankowski et al. |
| 2014/0269199 | A1 | 9/2014 | Weldon et al. |
| 2014/0327543 | A1 | 11/2014 | Showen et al. |
| 2014/0340222 | A1 | 11/2014 | Thornton et al. |
| 2014/0361886 | A1 | 12/2014 | Cowdry |
| 2015/0070166 | A1 | 3/2015 | Boyden et al. |
| 2015/0071038 | A1 | 3/2015 | Boyden et al. |

FOREIGN PATENT DOCUMENTS

| | | |
|---|---|---|
| JP | 2012-203747 | 10/2012 |
| KR | 20120003756 | 1/2012 |

OTHER PUBLICATIONS

Freytag et al.; "A Survey of Audio Forensic Gunshot Investigations"; Audio Engineering Society, 26th International Conference; Jul. 7-9, 2005; pp. 1-4; Denver Colorado; www.audioforensics.com.

Maher, Robert C.; "Modeling and Signal Processing of Acoustic Gunshot Recordings"; IEEE Signal Processing Society, 12th Digital Signal Processing Workshop and 4th IEEE Signal Processing Education Workshop; Sep. 2006; pp. 257-261; IEEE; Jackson Lake, WY.

Maher, Robert C. et al.; "Deciphering Gunshot Recordings"; Audio Engineering Society, 33rd International Conference: Audio Forensics-Theory and Practice; Jun. 5-7, 2008; pp. 1-8; Audio Engineering Society; Denver, CO.

Maher, Robert C. et al.; "Directional Aspects of Forensic Gunshot Recordings"; Audio Engineering Society, 39th International Conference: Audio Forensics: Practices and Challenges; Jun. 17-19, 2010; pp. 1-6, Audio Engineering Society; Hillerød, Denmark.

Velea, Doru; "Acoustic Urban Evaluator 1.0: An aiding tool for SECURES®"; Defense and Security, International Society for Optics and Photonics; Proceedings of SPIE, 2005; pp. 236-244; vol. 5778; Bellingham WA.; Downloaded from: http://proceedings.spiedigitallibrary.org on Oct. 7, 2016.

Sanders et al.; "Acoustic Triangulation Device"; Apr. 16, 2010; pp. 1-9; School of Electrical Engineering and Computer Science, University of Central Florida.

Mazerolle, Lorraine Green; "Using Gunshot Detection Technology in High-Crime Areas" located at https://www.ncjrs.gov/txtfiles/fs000201.txt; Research in Progress Review; Jun. 1998; pp. 1-11; NCJRS.

Balilah et al.; "The Measurement of the Transmission Loss of Single Leaf Walls and Panels by an Impulse Method"; Journal of Sound and Vibration; Jun. 8, 1988; pp. 229-245; vol. 123 Issue 2; Academic Press Limited.

Cremer et al.; "A comparison of decision-level sensor-fusion methods for anti-personnel landmine detection"; Information Fusion 2.3; Jan. 23, 2001; vol. 2; pp. 187-208; Elsevier Science B.V.

Millet et al.; "Latest Achievements in Gunfire Detection Systems"; 01DB-Metravib Limonest (France); RTO-MP-SET-107, Paper 26; 2006; pp. 26-1 through 26-14; NATO OTAN.

Page et al.; "SECURES™: System for Reporting Gunshots in Urban Environments"; SPIE's 1995 Symposium on OE/Aerospace Sensing and Dual Use Photonics; International Society for Optics and Photonics; 1995; SPIE vol. 2497; pp. 1-13.

* cited by examiner

500 ⤴

502
Detect a triggering event within a building using a detector communicatively coupled to one or more microphones 504
Activate at least one of the one or more microphones to monitor a sound when the triggering event is detected

602
Receive an activating signal from a designated source

604
Activate at least one microphone to monitor a sound when the activating signal is received from the designated source

606
Generate a reporting signal based on the sound monitored

FIG. 6

SYSTEMS AND METHODS FOR MONITORING SOUND DURING AN IN-BUILDING EMERGENCY

CROSS-REFERENCE TO RELATED PATENT APPLICATIONS

This application is a continuation of U.S. patent application Ser. No. 14/021,147, filed Sep. 9, 2013, now U.S. Pat. No. 9,602,672, which is incorporated by reference herein in its entirety.

BACKGROUND

Security systems for buildings may be programmed to generate an alarm during an emergency. The alarm may include an audible or visual alert intended to inform persons within the building of the emergency. The alarm may also include a signal sent to a third party, such as an emergency responder (e.g., law enforcement, fire department, etc.), to inform the third party that assistance may be required at the building. Typically, these security systems employ detectors for detecting a triggering event (i.e., an event associated with an emergency) in the area of the building, thereby triggering or actuating the alarm when the triggering event is detected. For instance, the detectors may include a microphone for detecting a loud or unusual noise, a temperature sensor for detecting extreme temperatures, or a smoke detector for detecting the presence of smoke.

Typical security systems utilize detectors capable of detecting triggering events only within a specified area surrounding each detector. Therefore, detectors are often spread throughout the building in order to ensure that the security system is able to detect triggering events in all areas of the building. A security system may require detectors in every room or hallway of a building, for instance, which can result in a significant cost. In addition, in some cases the detectors may not be able to be hidden from view while maintaining their function, which can result in a less aesthetically-pleasing environment for persons within the building. Also, typical detectors for security systems have limited functionality, often being capable only of detecting a triggering event and sending a signal to actuate the alarm when the triggering event is detected. Therefore, the persons receiving the alarm may have limited information related to the emergency, which may make it more difficult for persons within the building and/or persons responding to the alarm (e.g., emergency responders) to take appropriate action.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

An embodiment of the present disclosure relates to a method for monitoring a building having one or more microphones coupled to a telephone within the building. The method includes detecting a triggering event within the building using a detector communicatively coupled to the one or more microphones, and activating at least one of the one or more microphones to monitor a sound when the triggering event is detected.

Another embodiment of the present disclosure relates to a system for monitoring a building having one or more microphones coupled to a telephone. The system includes a detector configured to detect a triggering event within the building and transmit an activating signal when the triggering event is detected, and a control module configured to receive the activating signal from the detector. The control module is programmed to activate at least one of the one or more microphones to monitor sound when the activating signal is received.

Another embodiment of the present disclosure relates to a method for monitoring an emergency within a building having one or more microphones coupled to one or more telephones within the building. The method includes receiving an activating signal from a designated source, activating at least one of the one or more microphones to monitor a sound when the activating signal is received from the designated source, and generating a reporting signal based on the sound monitored.

Another embodiment of the present disclosure relates to a telephone assembly for monitoring an emergency within a building. The telephone assembly includes a telephone, a microphone coupled to the telephone, and a control module coupled to the microphone and configured to receive an activating signal. The microphone is configured to be activated to monitor sound. The control module is programmed to activate the microphone when the activating signal is received from a designated source.

Another embodiment of the present disclosure relates to a system for providing a display map during an emergency within a building. The system includes a detector located within the building for detecting a triggering event, and a control module coupled to the detector and configured to receive triggering event data from the detector. The control module is programmed to record the triggering event data, plot a map of the building, generate a data point representing the triggering event data, and plot the data point on the map.

BRIEF DESCRIPTION OF THE FIGURES

FIG. 5 is a flow chart representation of a method for monitoring a building, according to one embodiment.

FIG. 6 is a flow chart representation of a method for monitoring an in-building emergency, according to one embodiment.

DETAILED DESCRIPTION

Figure 1:
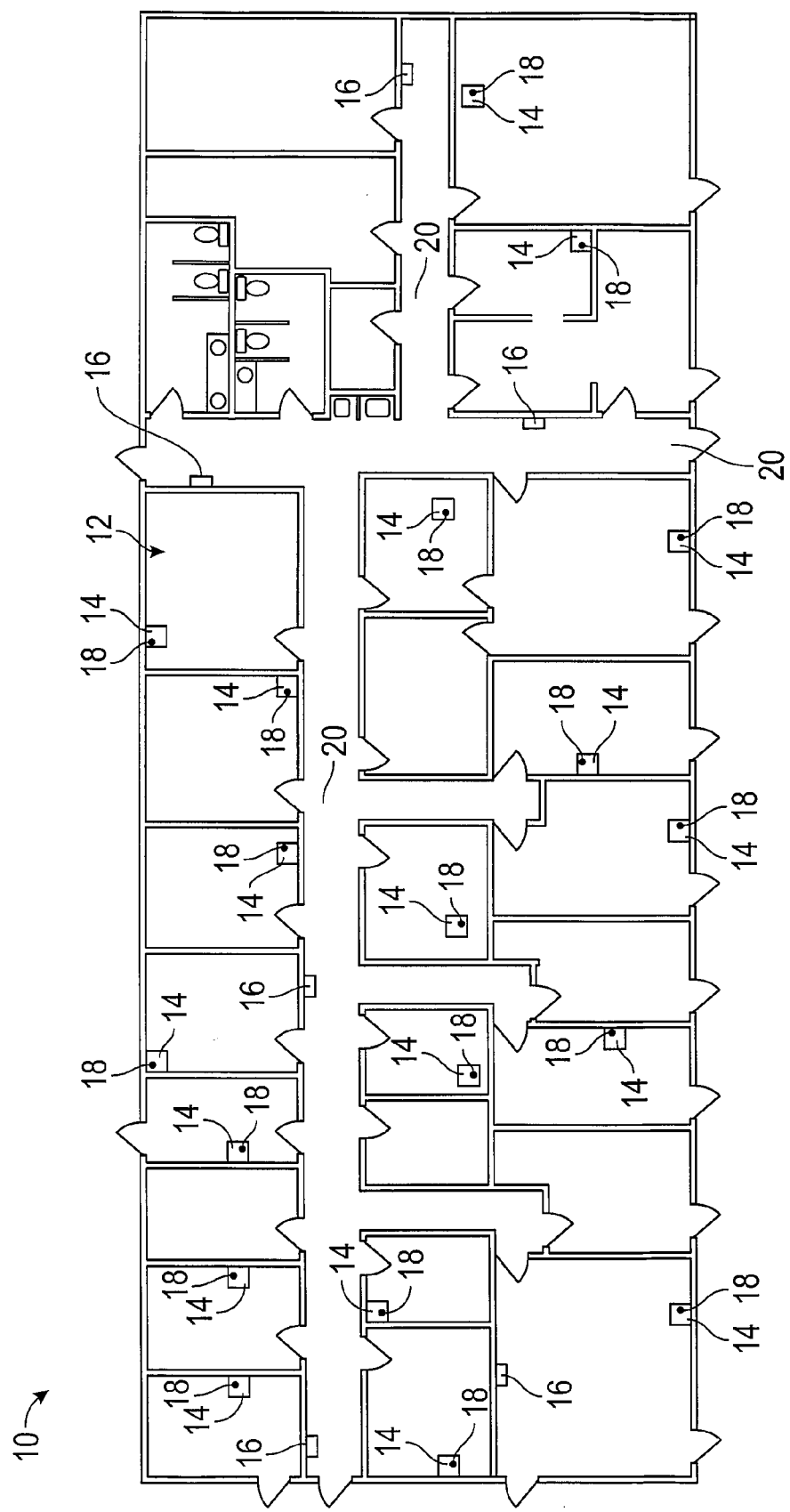
FIG. 1 is a plan view of a floor of a building having an emergency monitoring system, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, an emergency monitoring system is shown for detecting and/or monitoring an emergency within a building. In one embodiment, the emergency monitoring system includes a microphone coupled to a telephone within the building. The microphone is programmed to receive sound in the area of the microphone in order to detect a sound typically associated with an emergency situation, such as an unusually loud sound (i.e., a triggering event). The emergency monitoring system may also include other detectors (i.e., detection devices) for detecting other types of triggering events, such as extreme temperatures or other environmental irregularities. When a triggering event is detected, the emergency monitoring system sends a signal to activate the microphone, so that the microphone may monitor (e.g., record, store, report, etc.) sounds at or near the microphone. The emergency monitoring system may include a plurality of microphones for monitoring the entire building during an emergency. The monitored sounds may be recorded, otherwise stored, and/or sent to a third party, such as an emergency responder, so that persons within the building receive the necessary assistance.

Referring to FIG. 1, a layout for building 10 having an emergency monitoring system is shown, according to one embodiment. In the illustrated embodiment, the emergency monitoring system includes microphones 18 (i.e., a plurality of microphones) positioned within building 10 (e.g., office building, school building, restaurant, etc.) and is configured to monitor (e.g., report, record, etc.) local sounds within building 10. Microphones 18 may be any transducer or sensor configured to detect sound and/or convert the sound into an electrical signal. Microphones 18 may be distributed throughout building 10 as may be suitable for the particular application of building 10 and/or the emergency monitoring system. In one embodiment, microphones 18 are uniformly sized and shaped throughout building 10, but in other embodiments, microphones 18 are sized and shaped individually according to the function or purpose of each microphone 18 within building 10 and/or the emergency monitoring system.

In some embodiments, microphones 18 are activated from a non-activated state to an activated state in response to a signal (e.g., an activating signal). In the non-activated state, microphones 18 are configured to detect or otherwise receive local sounds (i.e., sounds near microphones 18). However, only those microphones 18 in the activated state are able to note, report, record, or otherwise monitor the local sounds that are received. In one embodiment, microphones 18 are automatically activated (e.g., by the activating signal) when a triggering event (e.g., a gunshot, a fire, an earthquake, a police emergency, a sign of human distress, a police siren, etc.) is detected within building 10 (e.g., by microphone 18, by detection device 16, etc.). For instance, one of microphones 18 may detect an audible triggering event within building 10 when in the non-activated state, automatically sending an activating signal to one or more microphones 18 within the emergency monitoring system, activating those microphones 18 to monitor local sounds. In other embodiments, microphones 18 are manually activated upon request and/or authorization from a designated source or other third party, such as law enforcement personnel. In still other embodiments, microphones 18 include a single, activated state for monitoring local sounds within building 10 at all times.

Microphones 18 may be coupled to telephones 14 (shown in further detail by way of example in FIG. 2) located within building 10. Telephones 14 may include landline phones (i.e., phones connected to a telephone network by a physical telephone line) that are either hard-wired (wired phones) or cordless (cordless phones), cellular phones, or another type of telecommunications device capable of receiving and/or transmitting an audible sound. In the illustrated embodiment of FIG. 1, telephones 14 are located within building 10 as required according to the function of building 10 and the preferences of the occupants of building 10. However, in other embodiments telephones 14 may be otherwise distributed throughout building 10 as may be suitable for the particular application of the emergency monitoring system, such as having one telephone 14 located in each room 12 (e.g., office, classroom, etc.) of building 10. Microphones 18 may be coupled to telephones 14 in order to monitor local sounds at or near telephones 14. In the illustrated embodiment of FIG. 1, each telephone 14 within building 10 includes at least one microphone 18 for monitoring local sounds. However, in other embodiments, some telephones 14 within building 10 may not include microphones 18. In still other embodiments, microphones 18 may be otherwise distributed throughout building 10 as may be suitable for the particular application of the emergency monitoring system, such as being positioned or installed separately from telephones 14 on one or more walls of rooms 12 and/or hallways 20. In one embodiment, for instance, at least one microphone 18 is located in each room 12 of building 10.

In one embodiment, one or more microphones 18 of the emergency monitoring system are transmitters for telephones 14, receiving spoken sound waves from a telephone user and converting the sound waves to electrical signals to be sent through the phone network. In this embodiment, the one or more microphones 18 may be available for use as transmitters for telephones 14 only when microphones 18 are in the non-activated state, no longer transmitting calls through the phone network when activated, or microphones 18 may remain available for transmitting calls when activated. In one embodiment, the transmitter within telephone 14 that is typically used for phone calls (not shown) is modified to perform the necessary function of microphone 18 as part of the emergency monitoring system. In other embodiments, telephones 14 may include microphone 18 and a separate phone call transmitter. In these embodiments, microphone 18 may still be activated in response to the triggering event (or another signal or response) to monitor local sounds, or microphone 18 may be configured to monitor local sounds at all times, even during phone calls.

In the illustrated embodiment of FIG. 1, the emergency monitoring system also includes a detector shown as detection device 16 (e.g., smoke detector, gas detector, gunshot detector, intrusion detector, microphone 18, camera, temperature detector, accelerometer, etc.) located within building 10 for detecting and/or monitoring one or more emergency-related conditions within building 10. In one embodiment, detection device 16 (e.g., automated device) is configured to detect a triggering event, sending a signal (e.g., the activating signal) to telephones 14 and/or microphones 18 to activate microphones 18 when the triggering event is detected. In one embodiment, signals (e.g., detection signals, activation signals, etc.) are sent wirelessly. In one embodiment, the signals are sent via a wired connection (e.g., using existing signal cables associated with telephones 14 or microphones 18). Detection device 16 may be coupled to telephones 14 and/or microphones 18, positioned within hallways 20 of building 10, or otherwise positioned or located within or proximate to building 10 in order to detect triggering events, as may be suitable for the particular application of detection device 16 and/or the emergency monitoring system. In one embodiment, detection devices 16 are positioned or located within building 10 such that a triggering event occurring anywhere within building 10 is detected by one of detection devices 16. When a triggering event is detected, detection device 16 may also report a condition of the triggering event to a third party (e.g., an occupant of building 10, a judicial agency, a law enforcement agency, a security agency, an owner of building 10, a news organization, etc.). The condition may include a location of the triggering event, a time associated with the triggering event, identifying characteristics of the triggering event, and/or any other information relevant to the triggering event according to the particular application of the emergency monitoring system. In one embodiment, detection device 16 includes an internal GPS for monitoring a location of detection device 16, thereby enabling monitoring a location of the triggering event and/or a monitored sound.

In one embodiment, rather than automatically activating microphones 18 when a triggering event is detected, detection devices 16 are configured to measure or observe one or more conditions of building 10, relaying or transmitting the conditions to a designated source (e.g., law enforcement personnel, fire department personnel, security personnel of building 10, an owner of building 10, a user of telephone 14, detection device 16, an automated device, etc.). The conditions may be sent to the designated source in real time, or at intervals. In this embodiment, the designated source may interpret the conditions to determine whether microphones 18 should be activated (e.g., whether an in-building emergency is present). If the designated source determines that microphones 18 should be activated, the designated source sends an activating signal to telephones 14 and/or microphones 18 in order to activate microphones 18. In this embodiment, the activating signal may indicate that conditions indicative of an emergency situation are present within building 10, and that building 10 should be monitored. Detection device 16 may also notify the designated source when a triggering event occurs in this embodiment. The designated source may then send the activating signal in response to notification of a triggering event. Further in this embodiment, the designated source may send the activating signal for another purpose or reason suitable for the particular application of the emergency monitoring system.

In some embodiments of the emergency monitoring system, the activating signal is verified to ensure the authenticity of the activating signal before microphones 18 are activated. In one embodiment, for instance, an activating signal from a designated source may be required in order to activate microphone 18. In this embodiment, microphone 18 and/or telephone 14 include a code stored on an internal storage device (i.e., a stored code), and any activating signals sent from the designated source include an activation code. When the activating code is received, telephone 14 and/or microphone 18 are programmed to verify the activating signal by matching the stored code to the activation code. If the activation code matches the stored code, the activating signal is verified and microphone 18 is activated. If the activation code does not match the stored code, microphone 18 is not activated and the designated source may be alerted. In another embodiment, the activating signal is verified remotely by a third party, such as a phone company. In this embodiment, the activating signal is sent to telephone 14, which is coupled to microphone 18. Telephone 14 then relays the activating signal to the third party to verify that the activating signal was sent from the designated source. If the activating signal is verified by the third party, microphone 18 is activated. If the activating signal is not verified, microphone 18 is not activated and the designated source may be alerted. In another embodiment, a court order from a judicial agency is required to verify the activating signal. In other embodiments, the activating signal may be verified in another manner suitable for the particular application of microphones 18 and/or the emergency monitoring system.

In one embodiment, at least one of microphones 18 (a detection microphone) is able to detect audible triggering events within building 10, when other microphones 18 are in the non-activated state. The detection microphone may also be configured or programmed to perform any tasks or functions described above in reference to detection device 16. For instance, when the triggering event is detected, the detection microphone may generate an activating signal, sending the activating signal to activate one or more telephones 14 and/or microphones 18 of the emergency monitoring system. In one embodiment, the detection microphone is self-activating, activating to monitor local sounds when the detection microphone detects a triggering event.

In some embodiments, one or more of microphones 18 may be selectively activated, with the activating signal being sent to only microphones 18 that are selected for activation (i.e., the selected microphones). The selected microphones may be automatically selected (e.g., based on a common characteristic of the selected microphones) by the emergency monitoring system, or the selected microphones may be manually selected by a designated person (e.g., the designated source). In one embodiment, the selected microphones are automatically selected by a controller such as control module 50. In this embodiment, the components of the emergency monitoring system (e.g., microphones 18, detection devices 16, etc.) are configured to send information to the controller in real-time, including a location of microphones 18, a location of any triggering events, etc., so that the information is continuously updated. The controller is programmed to automatically select microphones 18 for activation based on this information when a triggering event is detected. For instance, one or more of microphones 18 may be automatically selected for activation based on proximity (e.g., physical proximity) to an identified emergency, such as the triggering event. In one embodiment, the microphones are selected based on proximity to a triggering event area (e.g., within a radius surrounding the triggering event), such that each of the selected microphones is within the triggering event area and all microphones 18 within the triggering event area are selected. In this embodiment, the activating signal is sent to the selected microphones, activating all of the selected microphones to monitor a sound within the triggering event area. In another embodiment, the activating signal includes the triggering event area and is sent to all microphones 18. In this embodiment, microphones 18 are programmed to interpret the activating signal such that only those microphones 18 within the triggering event area are activated. In another embodiment, the activating signal is sent to only those microphones 18 within an area surrounding the detector (e.g., detection device 16, a detection microphone) that that detected the triggering event (i.e., the detector that sent the activating signal).

One or more of microphones 18 may also be organized or sorted into a microphone group for selective activation. The microphone group may be selected at random, or the microphone group may be based on one or more common characteristics of microphones 18 within the microphone group. For instance, the microphone group may be selected based on a common location or region of microphones 18 within building 10, proximity to an emergency or triggering event, a common function of microphones 18, or any other characteristic or condition suitable for the particular application of the emergency monitoring system. The microphone group may be pre-selected (i.e., before a triggering event is detected), selected when the triggering event is detected, or selected at another time suitable for the particular application of the emergency monitoring system. In one embodiment, for instance, the microphone group is selected after the triggering event is detected, and the microphone group is based on proximity to the triggering event. Once selected or organized, the microphone group may be collectively activated in response to an activating signal. An activating signal may be sent to all microphones 18 within the microphone group, for instance, or the activating signal may be sent to one microphone 18 within the microphone group, with the activating signal being relayed to all other microphones 18 within the microphone group in order to activate all microphones 18 within the microphone group.

When one or more microphones 18 are activated in response to a triggering event within building 10, the activated microphones (i.e., any microphones 18 that are activated) may generate a signal (e.g., an activation signal) conveying or representing one or more conditions related to the activated microphone(s) and/or the triggering event. The conditions represented by the activation signal may include a location of the activated microphone(s). When microphones 18 are substantially stationary within building 10, such as when coupled to landline telephones 14, the location of microphones 18 may be noted and stored (e.g., by control module 50) so that the activation signal includes a location of microphone 18. When microphone 18 is coupled to a cellular phone, the internal GPS of the cellular phone may be used to monitor the location of microphone 18 (or a location of a triggering event, a location of monitored sound, etc.). The location of microphone 18 may then be included within the activation signal. The activation signal may also include a time associated with the triggering event and/or the activating signal, and/or any other conditions suitable for use by the emergency monitoring system.

In one embodiment, the activated microphones are configured to send the activation signal directly to a third party (e.g., a user of telephone 14 that is coupled to an activated microphone, an occupant of building 10, a judicial agency, a law enforcement agency, a security agency, an owner of building 10, a news organization, etc.) when the activation signal is generated (i.e., in real-time). In another embodiment, the activated microphones are configured to send the activation signal to a controller such as control module 50 when the activation signal is generated. In this embodiment, the controller may either store the activation signal for later use or relay (send) the activation signal to the third party. For instance, in one embodiment the activation signal is recorded or stored by a memory device (e.g., memory 54) coupled to the activated microphone as part of a telephone assembly (shown in FIG. 2). In another embodiment, the activation signal is recorded at a remote site, such as at a location associated with the third party. In either embodiment, the activation signal may be recorded using non-erasable memory.

In one embodiment, the emergency monitoring system is configured to generate a reporting signal based on the sound monitored by microphones 18 (i.e., the monitored sound). The reporting signal may be generated by the activated microphones, telephones 14 coupled to the activated microphones, control module 50, or another component of the emergency monitoring system. The reporting signal may include a sound recording of the monitored sound, data related to any unusual sound events (e.g., sounds over a specified decibel level or outside of a specified range, sounds originating from an unusual area within building 10, etc.) or triggering events, or any other data or information related to the emergency monitoring system. The reporting signal may also include an identification of which microphones 18 were activated, a location of the activated microphones, a time at which the activated microphones were activated, identifying characteristics of the triggering event(s), or other information related to the monitored sound and relevant to the particular application of the emergency monitoring system. In one embodiment, the activated microphones are configured or programmed to send the reporting signal directly to a third party (e.g., a user of telephone 14 coupled to the activated microphone, an occupant or owner of building 10, a judicial agency, a law enforcement agency, a security agency, an owner of building 10, a news organization, etc.). In another embodiment, the activated microphones store or record the reporting signal on a connected memory device (e.g., memory 54), sending one or more reporting signals to the third party upon request or based on a reporting schedule. In another embodiment, the activated microphones are configured to send the reporting signal directly to the third party in real-time (i.e., when the reporting signal is generated). The activated microphones may also be configured to send the reporting signal to the third party through a controller such as control module 50. In such an embodiment, the controller may store the reporting signal, sending one or more reporting signals to the third party upon request or based on a reporting schedule. The controller may also send the reporting signal to the third party when the reporting signal is received from the activated microphone(s) (i.e., in real-time). In one embodiment, the reporting signal is also sent to a remote site, where the reporting signal is stored and/or recorded for later use.

The monitored sound is recorded by the emergency monitoring system in some embodiments. In one embodiment, microphones 18 include a sound recorder (i.e., audio recorder) such that when activated, microphones 18 may be used to monitor and record a sound, generating a sound recording. In other embodiments, the emergency monitoring system may include one or more sound recorders otherwise positioned or located within (or outside of) building 10 for recording the monitored sound and generating the sound recording. For instance, the monitored sound may be recorded at a remote site to ensure that the sound recording is not lost or damaged. Once the sound recording is generated, the sound recording may be stored in a memory device or other storage location. For instance, microphones 18 and/or telephones 14 may include a memory device (e.g., internal storage device) for storing the sound recording once the sound recording is generated. For instance, telephone 14 and/or microphone 18 may include a controller such as control module 50 for storing the sound recording. The sound recording may also be transmitted to another component or device of the emergency monitoring system for storage, upload, and/or playback. In one embodiment, microphones 18 are programmed or configured to send the sound recording to a third party, such as a remote site, where the sound recording may be stored. In another embodiment, microphones 18 are programmed or configured to send the sound recording to a communicatively connected controller such as control module 50 (shown in further detail in FIG. 4), where the sound recording may be stored on a memory device such as memory 54 (also shown in FIG. 4). The controller may also transmit or send the sound recording to another component or device of the emergency monitoring system, or to a third party. The sound recording may be recorded by or stored on non-erasable memory. The sound recording may be stored locally (e.g., on a memory device of microphone 18 or telephone 14) when the sound recording is generated, then uploaded at a later time to a third party or another remote site. The sound recording(s) may be uploaded upon request (e.g., from a third party) or based on a schedule (e.g., uploaded periodically).

Figure 2:
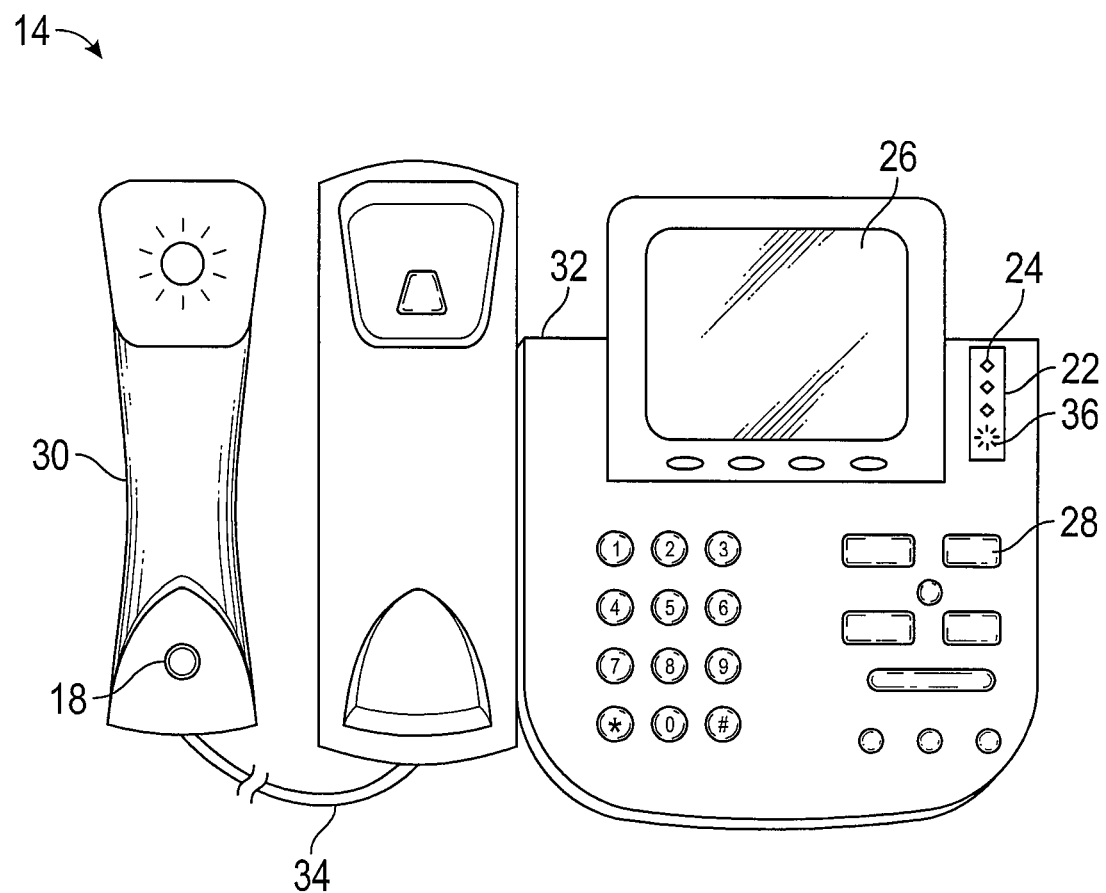
FIG. 2 is a front view of an office telephone for an emergency sound monitoring system, according to one embodiment.

Referring now to FIG. 2, telephone 14 (i.e., a telephone assembly) is shown according to one embodiment. In this embodiment, telephone 14 is a landline or wired phone that is connected to a telephone network by a physical telephone line and includes receiver 30 coupled to console 32 by cord 34. However, in other embodiments telephone 14 may be or include a cordless phone having a cordless or remote receiver, a cellular phone connected by a radio link to a cellular network, or another type of telecommunications device capable of receiving and/or transmitting an audible sound. In the illustrated embodiment of FIG. 2, microphone 18 is coupled to receiver 30 as part of the telephone assembly, but microphone 18 may be otherwise coupled to telephone 14 in other embodiments. Microphone 18 is configured to convert audible sounds into electronic signals so that the electronic signals may be transmitted to a remote location. In one embodiment, microphone 18 is used as a transmitter for phone calls, receiving audible sounds from a user of telephone 14, converting the audible sounds into an electronic signal, and transmitting the electronic signal through the telephone network. In other embodiments, telephone 14 includes a separate transmitter and microphone 18 is used solely for the purposes of the emergency monitoring system. In one embodiment, a user is prevented from making or receiving phone calls when microphone 18 is in the activated state, but the user may manually override this function by pressing one of the buttons (e.g., button 28) of telephone 14 in this embodiment.

In one embodiment, telephone 14 includes a controller (e.g., control module 50) that is communicatively coupled to microphone 18 and telephone 14 and configured to remotely receive signals or requests (e.g., the activating signal) from one or more sources within the emergency monitoring system in order to activate microphone 18. The controller may be configured to receive the signals by a wired connection connecting the one or more sources to the controller, or the controller may be configured to receive the signals wirelessly, such as by a wireless network. When the signals are received by the controller, the controller may respond to the signals accordingly, such as to activate microphone 18. The controller may also be configured to send one or more signals by a wired connection or a wireless network, such as to transmit a reporting signal to another location, or for any other purposes of the emergency monitoring system.

In some embodiments, the controller may be programmed to activate microphone 18 to monitor sound when the activating signal is received from a designated source (e.g., law enforcement personnel, fire department personnel, security personnel of building 10, an owner of building 10, a user of telephone 14, an emergency responder, a judicial agency, etc.). For instance, the controller may be programmed to verify that the activating signal is received from the designated source, and may be further programmed within this embodiment to activate microphone 18 only when the activating signal is verified to be received from the designated source. In one such embodiment, the controller includes a stored code and the activating signal (if received from the designated source) includes an activation code. The stored code may be programmed onto an accessible memory device (e.g., memory 54) of the controller, or the stored code may be otherwise included or stored within the controller such that the controller is able to access the stored code. In this embodiment, the controller is programmed to verify that the activating signal was received from (and sent by) the designated source by matching the activation code to the stored code (e.g., verifying that the activation code and the stored code are substantially the same, verifying that the activation code corresponds with the stored code, etc.), activating microphone 18 if the activating signal was received from the designated source. In another embodiment, the controller activates microphone 18 only if an activating signal is received from at least two designated sources, verifying that the activating signal(s) are received from the at least two designated sources. In another embodiment, the controller is programmed to obtain consent from a user of telephone 14 in order to activate microphone 18. The user may provide consent by pressing one of the buttons (e.g., button 28) of telephone 14, by verbal confirmation through microphone 18 (i.e., via voice-activation), or in another manner suitable for the particular application of the emergency monitoring system.

In some embodiments, the controller may be programmed to deactivate microphone 18 at a later time. For instance, the deactivation may be after a specified time period, after monitoring of microphone 18 indicates a lack of nearby sounds related to the triggering event, after the triggering event has been resolved, etc. In some embodiments, deactivation is responsive to a deactivation signal from a designated source, and such deactivation signal may be subject to verification.

In the illustrated embodiment of FIG. 2, telephone 14 includes emitter 22 for emitting a signal or other type of indicator based on a status or condition of building 10 and/or one or more other components of the emergency monitoring system. In one embodiment, emitter 22 emits a local signal when microphone 18 is activated (e.g., when the triggering event occurs, when the activating signal is received, etc.). The local signal may include a sound, a light, a vibration, or any other audible, visual, or other type of feedback for indicating when microphone 18 and/or telephone 14 is activated. Emitter 22 is shown as an example to include at least one light 24 that turns on or otherwise emits a light to indicate that microphone 18 is activated. In this embodiment, emitter 22 also includes speaker 36 for emitting an identifiable sound or other audible signal to indicate that microphone 18 is activated. In some embodiments, emitter 22 emits a local signal when microphone 18 is deactivated.

Telephone 14 (i.e., the telephone assembly) may also include screen 26. Screen 26 may be used to visually convey the local signal, such as by displaying a message indicating that microphone 18 has been activated, or by identifying some or all of microphones 18 within the emergency monitoring system that have been activated. Screen 26 may also be used to display any other information related to telephone 14 and/or any other components of the emergency monitoring system, including text, pictures, video, or any other graphics suitable for the emergency monitoring system. In one embodiment, screen 26 is used to display a building map, such as display map 40 shown in FIG. 3, that displays specific information related to building 10 and/or the emergency monitoring system. In one embodiment, screen 26 includes a touch screen configured to receive input from a user of telephone 14 through on-screen manipulation. Screen 26 is shown connected to telephone 14 in the illustrated embodiment of FIG. 2. However, in other embodiments screen 26 may be otherwise coupled to telephone 14 and/or microphone 18. In still other embodiments, screen 26 is a separate component from telephone 14 and/or microphone 18. For instance, screen 26 may be located elsewhere within building 10, being remotely connected to telephone 14 and/or microphone 18 (e.g., via control module 50) in order to receive and display information related to the emergency monitoring system. In another embodiment, screen 26 is located at a remote site separate from building 10 in order to convey information related to the emergency monitoring system to a designated source or another third party. Screen 26 may be otherwise sized and shaped in other embodiments, and may be also be otherwise configured to receive and/or display data or input in other embodiments, as may be suitable for the particular application of the emergency monitoring system in those embodiments.

Telephone 14 also includes buttons such as button 28 for a user to initiate actions or to enter data. For instance, a user of telephone 14 may use the buttons to dial a phone call or perform other telephone functions, or to interact with one or more components of the emergency monitoring system, such as to provide feedback related to the triggering event or to provide consent to activate microphone 18 in order to monitor local sounds. The user may also use the buttons to navigate screen 26, such as to monitor one or more components or conditions of the emergency monitoring system.

In one embodiment, telephone 14 is a cellular phone. In this embodiment, telephone 14 may also include microphone 18, emitter 22, light 24, speaker 36, screen 26, and a controller, as described above. Some cellular phones included as part of the emergency monitoring system may be employer-issued phones, typically being issued to persons within building 10 by owners or lessees of building 10. In these cases, the employer-issued cellular phones may be pre-authorized to detect and monitor local sounds within building 10, such as by an employment agreement or by another phone authorization agreement. When cellular phones are pre-authorized, microphones 18 of the cellular phones are used to receive and detect local sounds, sending an activating signal if an audible triggering event is detected by microphones 18. In addition, microphones 18 of the pre-authorized cellular phones may be activated to monitor local sounds within building 10, such as by an activating signal or by request from a designated source. Some other cellular phones may be personal cellular phones of persons within building 10. Personal cellular phones may also be pre-authorized by the owners of the cellular phones. For instance, persons working within building 10 may sign a voluntary agreement to allow their personal cellular phones to be used within the emergency monitoring system, or visitors of building 10 may have an opportunity to register their personal cellular phones as part of the emergency monitoring system upon entering building 10. For instance, building 10 may institute an implied consent policy in which visitors of building 10 (or designated locations within it) are considered as having pre-authorized use of their cellular phones as part of the emergency monitoring system. This implied consent may be responsive to a posted notice or may allow visitors an opt-out capability. If a cellular phone is not pre-authorized, the cellular phone is not utilized as a detector. However, the activating signal may be sent to these non-authorized cellular phones by the emergency monitoring system, providing the user of the non-authorized cellular phone with the option of allowing their phone to be used to monitor local sounds as part of the emergency monitoring system.

Figure 3:
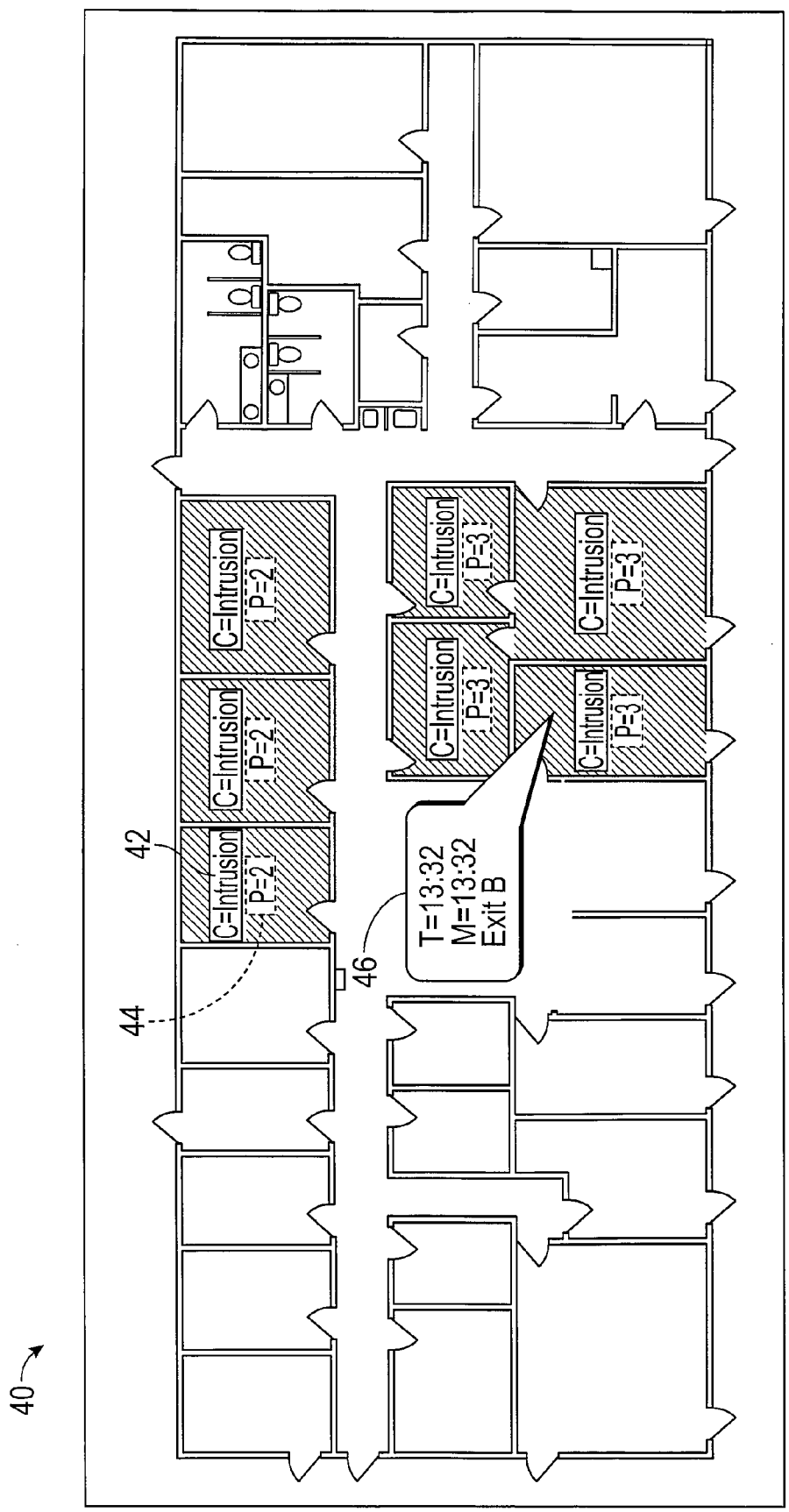
FIG. 3 is a screen view of a display map for an emergency sound monitoring system, according to one embodiment.

Referring now to FIG. 3, display map 40 is shown according to one embodiment. Display map 40 may be generated and/or provided as part of the emergency monitoring system in order to convey information related to the emergency monitoring system and/or the associated building (e.g., building 10). For instance, display map 40 may visually convey information (e.g., a data point) related to triggering events, such as a time associated with the detection event, a categorization or classification of the triggering event (e.g., gunshot, fire, earthquake, intrusion, sign of human distress, police siren, etc.), and/or a location of the triggering event within the associated building. In one embodiment, a controller (e.g., control module 50) having a processor (e.g., processor 52) receives signals (e.g., the activation signal) from detection devices 16, microphones 18, and/or other components of the emergency monitoring system that include information related to the detected triggering events (e.g., triggering event data), and/or other information relevant to the emergency monitoring system. In this embodiment, the controller is programmed to receive the signals, automatically generating display map 40 based on the triggering event data and any other information within the received signals. For instance, the controller may generate data points representing the triggering event data recorded by the emergency monitoring system, plotting the data points on display map 40. The controller may also receive activating signals, activation signals, reporting signals, or other signals within the emergency monitoring system, automatically generating data points representing any relevant information within the received signals, and plotting the data points on display map 40. In other embodiments, display map 40 may be manually generated, such as by a person at a remote site receiving signals from the emergency monitoring system and interpreting the data within the signals to generate and plot data points on display map 40.

When more than one triggering event occurs within the associated building, display map 40 may provide priorities for each of the triggering events, such as to guide emergency responders (e.g., police officers, fire fighters, emergency medical technicians, etc.) responding to the scene. The triggering events may be prioritized automatically (e.g., by control module 50) or manually (e.g., by a person at a remote site). For instance, the triggering events may be ranked according to urgency of the triggering event, according to a danger level, assigned a rating to denote the level of emergency, or prioritized in any other manner as may be suitable for the particular application of display map 40 and/or the emergency monitoring system. In one embodiment, the triggering events are prioritized based on acoustic signatures of the detected sound. In this embodiment, the acoustic signatures may include a sound typically associated with human distress, such as a vocal sound above a specified decibel level. In another embodiment, the triggering events are prioritized based on a location of the triggering event relative to a location of persons detected within the associated building (e.g., by activated microphones 18), such as by proximity of the triggering events to persons within the associated building. In another embodiment, the triggering events are prioritized based on proximity of the triggering events to an escalation danger (e.g., fire in proximity to a gas tank, escape route, etc.).

Display map 40 may also include or provide prioritized evacuation instructions for persons within the associated building. The prioritized evacuation instructions may be automatically generated (e.g., by control module 50) based on one or more conditions of the associated building and/or the emergency monitoring system, or manually generated by a person associated with the emergency monitoring system. In one embodiment, the prioritized evacuation instructions are displayed on display map 40, with specific instructions being displayed on regions of display map 40 according to location within the associated building and/or the location of the one or more triggering events. In another embodiment, the prioritized evacuation instructions are sent to telephones 14 within the emergency monitoring system according to a location of telephones 14 within the associated building (e.g., building 10). In this embodiment, the evacuation instructions may include text displayed on screen 26, an audible message conveyed through receiver 30 or another speaker located on telephone 14, or the evacuation instructions may be conveyed in another manner suitable for the particular application of the emergency monitoring system.

In one embodiment, display map 40 is displayed on all screens 26 within the emergency monitoring system when a detection event occurs. In this embodiment, display map 40 may be displayed on screens 26 until instructions are received to remove display map 40 from screen 26 (e.g., an automatic signal from control module 50, manual instructions from the designated source, etc.). In other embodiments, display map 40 is displayed elsewhere, such as in one or more locations of the associated building, at a remote site, or in another location suitable for the particular application of the emergency monitoring system. In one embodiment, display map 40 is displayed in real-time and updated continuously.

In the illustrated embodiment of FIG. 3, display map 40 depicts building 10 when one or more triggering events have been detected and one or more microphones 18 are activated. In this embodiment, rooms 12 having activated microphones (i.e., the activated rooms) are identified by a criss-cross pattern across each room 12 on display map 40. However, in other embodiments, the activated rooms may be identified by a unique color scheme, shading, or any other visual, audible, or other type of indicator. In one embodiment, each activated room includes room-specific information related to the emergency monitoring system. For instance, the activated room may include text on display map 40 indicating the triggering event that caused the activated microphone within the activated room to activate, including a time the triggering event was detected, a categorization of the triggering event, a time the activated microphone was activated, etc. Display map 40 may also include a priority classification, such as a priority value indicating which of the activated rooms first require an emergency response (e.g., which activated rooms require immediate assistance). Further, display map 40 may include prioritized evacuation instructions specific for each activated room based on proximity to the triggering event(s), a building exit, or any other conditions of building 10 and/or the emergency monitoring system.

In the illustrated embodiment of FIG. 3, a categorization of the detection event and a priority classification are displayed within the activated rooms of display map 40 by text box 42 and text box 44, respectively. In this embodiment, the activated rooms are grouped for the purposes of priority classification according to location within building 10, with each activated room within a selected group having an identical priority classification. In other embodiments, each activated room may have an individual priority classification based on the particular characteristics of the activated room, including location within building 10. Display map 40 is also configured to convey other information related to the activated rooms in response to an input or request from a user. In the illustrated embodiment of FIG. 3, for instance, text box 46 is displayed in response to input from the user. In this embodiment, text box 46 includes a time of the triggering event, time at which microphone 18 was activated, as well as prioritized evacuation instructions for the selected room 12. In one embodiment, display map 40 is displayed on a touch screen (e.g., screen 26), and text box 46 is displayed when the user touches the activated room on the touch screen. In other embodiments, text box 46 may be displayed in response to the user pressing a button (e.g., button 28), or in response to another type of input or request from the user or another associated party (e.g., the designated source), as may be suitable for the particular application of display map 40 and/or the emergency monitoring system.

Figure 4:
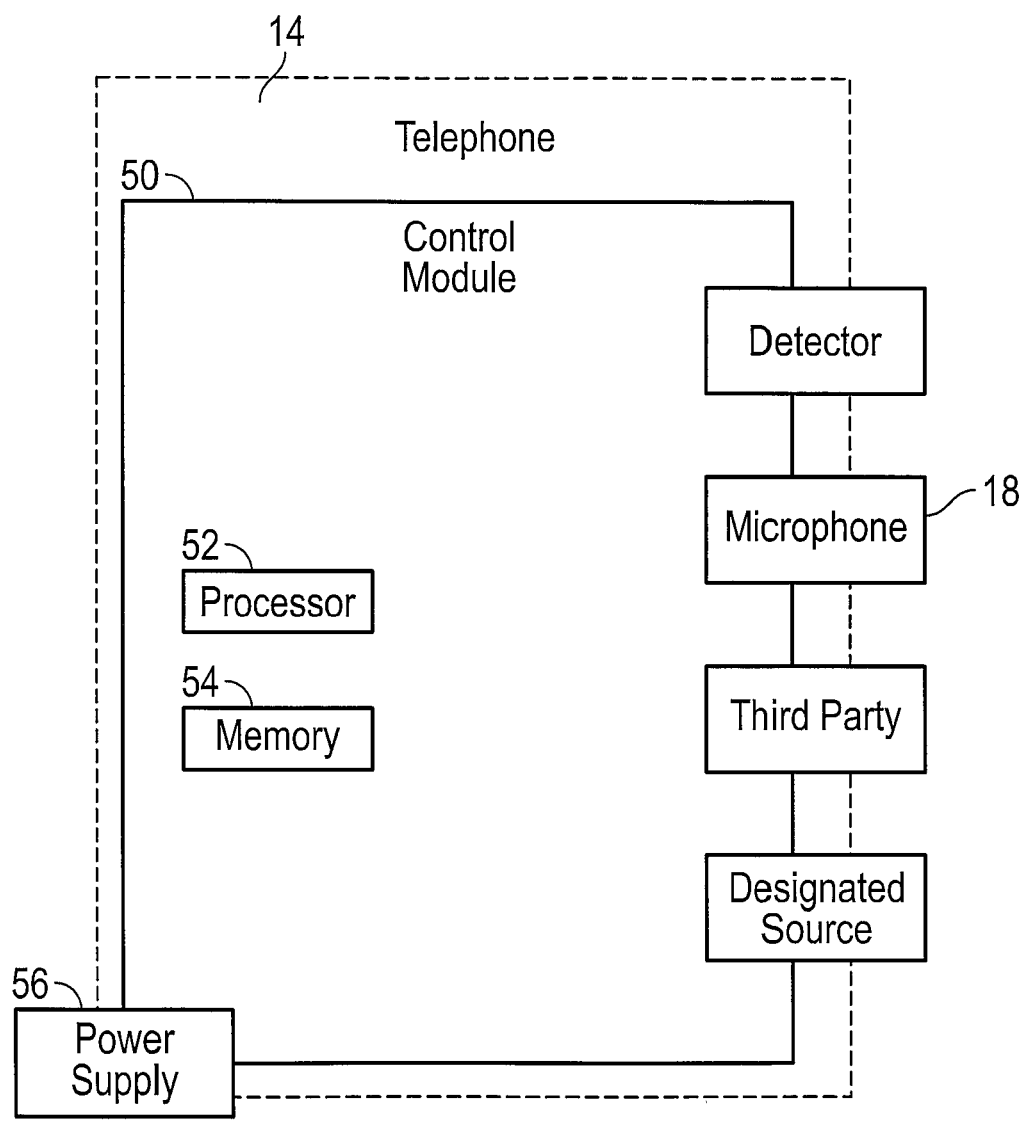
FIG. 4 is a block diagram of a control module for an emergency monitoring system, according to one embodiment.

Referring now to FIG. 4, a block diagram of control module 50 is shown according to one embodiment. Control module 50 may be used to control one or more components of the emergency monitoring system, to store information or signals related to the emergency monitoring system, as well as to perform any functions or processes of the emergency monitoring system. In the illustrated embodiment of FIG. 4, control module 50 is shown coupled to telephone 14 as part of the telephone assembly, and may be used to control the operation of one or more components of the telephone assembly. However, in other embodiments, control module 50 may be an independent component of the emergency monitoring system. For instance, control module 50 may be stored at a secure location within building 10. Control module 50 may also be stored at an off-site or remote location and configured to communicate remotely with one or more components of the emergency monitoring system.

In the illustrated embodiment of FIG. 4, control module 50 includes processor 52 and a memory device shown as memory 54. In this embodiment, memory 54 stores programming instructions that, when executed by processor 52, control the operations of telephone 14, including the activation of microphone 18 to monitor local sounds. In other embodiments, memory 54 and processor 52 may be used to control other components of the emergency monitoring system, as well as to execute any functions or processes of the emergency monitoring system described above. In one embodiment, memory 54 is non-erasable. Control module 50 is in electrical communication with telephone 14, detection device 16, microphone 18, and any other components of the emergency monitoring system, such as by a physical wire or by a remote (e.g., wireless) connection, as may be suitable for the particular application of control module 50. For instance, the emergency monitoring system may include other detectors, sensors, receivers, etc., in other embodiments. In such arrangements, control module 50 is in electrical communication with each of the components of the emergency monitoring system.

In one embodiment, control module 50 is programmed to generate the reporting signal based on the local sounds monitored by microphone 18. The reporting signal may include an identification of microphone 18, a time at which microphone 18 was activated, an identification of a designated source, and/or a sound recording of the monitored sound. In one embodiment, control module 50 is programmed to store or record the reporting signal within memory 54 to be available for upload. The stored reporting signal may be uploaded from memory 54 upon request, or by a schedule. In another embodiment, control module 50 sends the reporting signal directly to a third party. In this embodiment, the reporting signal may be sent in real-time (i.e., when the reporting signal is generated).

In one embodiment, control module 50 is programmed to receive the activating signal. Control module 50 may then activate one or more microphones 18 in response. The activating signal may include activating data based on the activating signal that is stored by control module 50 when received. The activating data may include an identification of the sender of the activating signal, a time related to the activating signal, a duration of the activating signal, an activation code, or other information as may be suitable for the particular application of the emergency monitoring system. In one embodiment, control module 50 is programmed to send the activating data to an owner of one of telephones 14 (e.g., telephone 14 coupled to the activated microphone, telephone 14 coupled to control module 50, etc.). In another embodiment, control module 50 is programmed to send the activating data to a third party, such as a user of telephone 14, an occupant of building 10, a judicial agency, a law enforcement agency, a security agency, an owner of building 10, a news organization, or any other third party as may be suitable for the particular application of the emergency monitoring system. Control module 50 may also be programmed to upload the activating data to a permanent and non-erasable storage device.

In one embodiment, control module 50 is programmed to receive a deactivating signal. Control module 50 may then deactivate one or more microphones 18 in response. The deactivating signal may include deactivating data based on the deactivating signal that is stored by control module 50 when received. The deactivating data may include an identification of the sender of the deactivating signal, a time related to the deactivating signal, a deactivation code, or other information as may be suitable for the particular application of the emergency monitoring system. In one embodiment, control module 50 is programmed to send the deactivating data to an owner of one of telephones 14 (e.g., telephone 14 coupled to the activated microphone, telephone 14 coupled to control module 50, etc.). In another embodiment, control module 50 is programmed to send the deactivating data to a third party, such as a user of telephone 14, an occupant of building 10, a judicial agency, a law enforcement agency, a security agency, an owner of building 10, a news organization, or any other third party as may be suitable for the particular application of the emergency monitoring system. Control module 50 may also be programmed to upload the deactivating data to a permanent and non-erasable storage device.

Control module 50 may also be programmed to generate, store, record, and/or send the activating signal, the activation signal, and/or another signal used by the emergency monitoring system, as may be suitable for the particular application of the system. Control module 50 may also be programmed to use any of the above described electronic signals in any manner described above in reference to any other electronic signal(s) of the emergency monitoring system.

Control module 50 receives operational electrical power from power supply 56. In one embodiment, power supply 56 provides power to control module 50 and all components of telephone 14, including microphone 18. Power supply 56 may also supply power to other components of the emergency monitoring system. Power supply 56 may be any suitable power source, including, but not limited to, a battery, a generator, a solar power source, grid power, or a combination thereof. In arrangements where power supply 56 includes a rechargeable battery, the battery may be charged during operation through another power source (e.g., a generator, a solar panel, grid power, etc.).

Referring now to FIG. 5, a flow chart 500 of a method for monitoring a building is shown, according to one embodiment. In this embodiment, the method includes detecting a triggering event within a building (e.g., building 10) using a detector (e.g., detection device 16) that is communicatively coupled to one or more microphones (e.g., microphone 18) at 502. The method also includes activating at least one of the microphones to monitor a sound (e.g., within building 10) when the triggering event is detected at 504.

Referring now to FIG. 6, a flow chart 600 of a method for monitoring an in-building emergency is shown, according to one embodiment. In this embodiment, the method includes receiving an activating signal from a designated source at 602. The method also includes activating at least one microphone (e.g., microphone 18) to monitor a sound when the activating signal is received from the designated source at 604. The method further includes generating a reporting signal based on the monitored sound at 606.

The construction and arrangement of the apparatus, systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the described embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. Such joining may be communicative, rather than physical.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for providing a display map during an emergency within a building, the system comprising:
    at least two detectors located within the building for detecting triggering events, wherein each detector of the at least two detectors includes a microphone coupled to a telephone within the building and configured to detect a triggering event; and
    a control module configured to receive respective triggering event data from the at least two detectors, the control module being programmed to:
        record the respective triggering event data from the at least two detectors;
        generate a respective data point representing each respective triggering event data for display on the display map;
        plot each respective data point on the display map;
        generate a priority classification for the at least two triggering events based on the respective triggering event data; and
        plot the priority classification on the display map.

2. The system of claim 1, wherein the triggering event includes an audible sound.

3. The system of claim 1, wherein the control module is programmed to:
    generate prioritized evacuation instructions for persons within the building based on the at least two triggering events; and
    plot the prioritized evacuation instructions on the map.

4. The system of claim 3, wherein the prioritized evacuation instructions are based on a location of the at least two triggering events.

5. The system of claim 1, wherein the control module is programmed to:
    generate prioritized evacuation instructions for persons within the building based on the respective triggering events; and
    plot the prioritized evacuation instructions on the display map.

6. The system of claim 1, wherein the control module is programmed to:
    generate one or more danger regions for persons within the building based on the respective triggering event data; and
    plot the one or more danger regions on the display map.

* * * * *

UNITED STATES PATENT AND TRADEMARK OFFICE
CERTIFICATE OF CORRECTION

PATENT NO. : 9,800,738 B2  
APPLICATION NO. : 14/699929  
DATED : October 24, 2017  
INVENTOR(S) : Edward S. Boyden et al.

Page 1 of 1

It is certified that error appears in the above-identified patent and that said Letters Patent is hereby corrected as shown below:

In the Specification

Column 1, Line 10:
Delete "No. 9,602,672" and insert --No. 9,602,673--

Signed and Sealed this
Fourteenth Day of August, 2018

Andrei Iancu
*Director of the United States Patent and Trademark Office*